(12) United States Patent
Dana

(10) Patent No.: US 8,365,753 B2
(45) Date of Patent: Feb. 5, 2013

(54) FLUID FLOW CONTROLLER

(76) Inventor: Yossi Dana, Jerusalem (IL)

( * ) Notice: Subject to any disclaimer, the term of this patent is extended or adjusted under 35 U.S.C. 154(b) by 944 days.

(21) Appl. No.: 11/916,659

(22) PCT Filed: Jun. 14, 2006

(86) PCT No.: PCT/IL2006/000686
§ 371 (c)(1),
(2), (4) Date: Dec. 6, 2007

(87) PCT Pub. No.: WO2006/134593
PCT Pub. Date: Dec. 21, 2006

(65) Prior Publication Data
US 2009/0193908 A1    Aug. 6, 2009

(30) Foreign Application Priority Data

Jun. 14, 2005  (IL) .......................... 169132

(51) Int. Cl.
*E03B 1/00* (2006.01)
(52) U.S. Cl. ............. 137/12; 137/528; 137/529; 251/65
(58) Field of Classification Search .................. 137/469, 137/529, 528, 538, 516.25, 516.29, 542, 137/220, 540, 12; 251/65
See application file for complete search history.

(56) References Cited

U.S. PATENT DOCUMENTS

| | | | |
|---|---|---|---|
| 1,539,617 A * | 5/1925 | Williston | 137/514 |
| 1,693,177 A * | 11/1928 | Hodgart et al. | 137/516.27 |
| 1,710,635 A * | 4/1929 | Wertz | 137/543.19 |
| 2,431,749 A | 12/1947 | Parker | |
| 2,938,540 A * | 5/1960 | Schatzman et al. | 137/508 |
| 3,063,467 A * | 11/1962 | Roberts, Jr. et al. | 137/516.29 |
| 3,294,115 A * | 12/1966 | Koenigsberg et al. | 137/527 |
| 3,515,163 A * | 6/1970 | Freeman | 137/102 |
| 3,561,466 A * | 2/1971 | Carden | 137/102 |
| 3,896,850 A * | 7/1975 | Waltrip | 137/554 |
| 4,210,174 A * | 7/1980 | Eross | 137/528 |
| 4,275,759 A | 6/1981 | Huang | |
| 4,750,705 A * | 6/1988 | Zippe | 251/65 |
| 5,320,136 A * | 6/1994 | Morris et al. | 137/528 |
| 5,443,092 A * | 8/1995 | Farnsworth et al. | 137/542 |
| 5,513,395 A * | 5/1996 | Chlebek et al. | 4/329 |
| 6,317,051 B1 | 11/2001 | Cohen | |

FOREIGN PATENT DOCUMENTS

| | | |
|---|---|---|
| CN | 85108667 | 11/1986 |
| CN | 1470787 | 1/2004 |
| EP | 0633488 A1 | 11/1995 |

(Continued)

*Primary Examiner* — Kevin Lee
*Assistant Examiner* — Macade Brown
(74) *Attorney, Agent, or Firm* — Deborah Gador

(57) ABSTRACT

The present invention relates to a magnetic flow controller which transforms a slow reduction in pressure of fluid flow over time to a measurable fluid flow. Once a threshold pressure differential is reached, a flow passage through the flow controller opens rapidly to a relatively large opening, thereby generating a volume of fluid at high flux flowing through the passage, particularly to permit the measurement of the volume of fluid in a conventional flow meter. The device of the present invention integrates this low flux and transforms it to a measurable fluid flux, so that the fluid can be measured by the fluid meter within its optimum error range. This is accomplished while maintaining a pressure drop in the flow meter which is within the permitted standards. Thus, the invention provides relatively sharp shifts between substantially high flux flow and no flow, in a pulse-like manner.

16 Claims, 12 Drawing Sheets

FOREIGN PATENT DOCUMENTS

| | | |
|---|---|---|
| JP | 46-030981 | 4/1946 |
| JP | 58-153768 | 10/1983 |
| JP | 63-76135 | 12/1989 |
| JP | 2000-205447 | 7/2000 |
| JP | 2000205447 | 7/2000 |
| JP | 2005-009506 | 1/2005 |
| JP | 2005009506 | 1/2005 |

* cited by examiner

FLUID FLOW CONTROLLER

FIELD OF THE INVENTION

The present invention relates to a device for permitting measurement of small fluid flows, in general and, in particular, to a fluid flow controller, especially for use in conjunction with a water meter, for permitting measurement of small flows of water.

BACKGROUND OF THE INVENTION

In order to measure water usage by various users in a system, each user is provided with a water meter in their water supply line, which measures and records the quantity of water passing through the meter. This measured quantity can be used by the user to track his usage, as well as by the local water supplier, such as a town, for billing purposes.

In many buildings there are leaks and other water demands at low volumes which are too small to be measured by the meter. However, since these flows continue all day long, the unmeasured usage can reach up to 15% of the total water supplied to that building. Traditionally, this problem is dealt with by using a higher class of metering system, i.e., from Class B to Class C, or even class D. Each measurement class has advantages and disadvantages. Moving from class A to higher classes dramatically improves the ability of the meter to measure low flux. However, the reliability of function of the meter becomes more problematic with each higher class, as does the cost of utilizing the system.

Another way to deal with this problem is to utilize meters of smaller diameter, i.e., reduce from ¾" to ½". In this way, the ability to measure low flux is increased, since the smaller the diameter, the lower the value of the nominal volume at which the meter will work for a long time without breaking down. The disadvantage of this method is that the pressure drop across the water meter at a given flow increases in inverse proportion to the diameter. Thus, smaller diameter pipes are likely to create an unacceptable pressure drop across the meter. Furthermore, reducing the diameter of the pipe, and the resultant reduction in pressure, is likely to result in a loss of water pressure to the consumer. To prevent this loss of pressure, larger pipes are required at a higher supply pressure. This means much higher costs of infrastructure and wasted energy resulting from the loss of pressure across the meter. Thus, while these methods may reduce somewhat the problem of unmeasured water flow, they do not provide a satisfactory solution, and cause additional problems.

A number of different kinds of water meters are in use today, multi-jet, single-jet, positive displacement, hydraulic oscillation meter, and so on. The range of flow or volume measurement of each meter is defined according to the following parameters and illustrated in FIG. 1. FIG. 1 is a graph illustrating the percentage measurement error over flux Q of a conventional water meter. $Q_{start}$ is the flux at which the meter begins to respond to the volume flowing through it. Measurement errors are likely to be tens of percent. As can be seen, there is a range between 0 and $Q_{start}$ where the meter stops, as it is unable to measure at all. From a minimum flux $Q_{min}$ to a higher flux Qt ($Q_{transition}$), about ±5% error is acceptable. At Qt ($Q_{transition}$) the acceptable percent error of the measurement cannot be higher than ±2% error. As can be seen, from Qt to $Q_{max}$ (the maximum flux possible through the meter with a pressure drop of less than 1 atm), the measurement is in the optimum range of less than ±2% error. As can be seen, in such a meter, a slow leak $Q_{leak}$ resulting in a slow, small volume flow, is likely to be lower than $Q_{start}$ or $Q_{min}$, and would not be detectable at all by the meter.

Conventional meters were designed to measure over a wide range of flux. However, this means that at the high and low ends of the range, the measurement is extremely inaccurate, if measured at all. In order to provide more accurate measurement over a particular range of flux, the combination meter was developed. A combination water meter includes a main meter which can be connected to a water main for determining larger amounts of water flow and to an auxiliary meter which is disposed in a bypass conduit for determining smaller amounts of water flow. These devices generally are very expensive to manufacture and maintain.

A mechanical device for preventing unmeasured quantities of fluids from passing the meters is illustrated in GB Patent 2083 to Meineke. This patent describes a meter having a main and a service pipe with a variable resistance placed between them. The device includes a valve between the main and the service pipe, which is acted upon by a slotted lever weighted by a rolling weight. When the weight is in the outward position, the resistance to the passage of fluid is great, but as the fluid pressure decreases in the service pipe, the valve and the lever are raised so that the weight slides to the other end of the slot, and the resistance diminishes, thus allowing a sudden opening of the valve.

There are known valves using a permanent magnet and a movable poppet attracted by a magnetic field. Generally, the poppet is round and held by the magnet in the valve seat until sufficient pressure is created to move it from the valve seat and open the valve. One such valve mechanism is shown and described in EP patent publication 925465. This application describes a pressure-opened and magnetically closed valve mechanism for fluids having a sealing body having at least one circular cross-sectional area sized to be wedged in the opening of the valve mechanism.

Another example of such a device is shown in U.S. Pat. No. 5,320,136 to Morris et al. This patent describes a magnetically operated check valve having a valve body, a movable poppet disposed therein and a magnet. When the liquid pressure acting on the poppet is below a minimum threshold, the poppet is attracted to the magnet, closing off the pipe. If a slow flow of liquid continues, the liquid is collected and held by the poppet until the pressure of the collected liquid exceeds the magnetic force, unseating the poppet to an open position. This poppet and magnet are configured to trap magnetically attracted particulates and prevent them from flowing to the valve seating region.

In these conventional valves, movement of the poppet immediately opens the valve seat over a relatively small surface area, permitting a small flow of liquid through the valve until equilibrium is reached between magnetic force attracting the poppet and decreasing fluid pressure acting on the poppet, until the poppet no longer moves away from the valve seat. Thus, these valves do not provide sufficiently large flows for measurement by conventional water meters.

Conventional magnetic valve mechanisms are designed to achieve equilibrium in the open position. Thus, when the fluid pressure overcomes the force of the magnetic field, the poppet is moved from the valve seat, creating a small fluid flow opening and a slow reduction in pressure. At the same time, as the poppet moves, the force of the magnetic field is reduced, and equilibrium is reached with the poppet in the open position, as long as there is a relatively fixed fluid flow through the valve above the threshold value.

There is also known, from U.S. Pat. No. 6,317,051, a water flow monitoring system for determining the presence of leaks in plumbing pipes having water flowing through the pipes under high pressure. The system includes a flow monitor which is mounted to the pipe, a controller composed of a timer or an accumulated volume meter to determine when the flow has continued for a pre-selected period of time or when the amount of water has exceeded a pre-selected accumulated volume threshold, and logic components respond to changes in the flow rate, at which time, a valve is actuated to stop flow through the pipe. This solution is very complicated and expensive to manufacture and maintain.

Accordingly, there is a long felt need for a device which concentrates low volumes of fluid and prevents fluid flow until there is a sufficient volume to be released as measurable flux, which can be measured in a conventional meter with an acceptable percentage error, and it would be desirable that such a device would close the flow passage rapidly when the fluid pressure acting on it drops.

SUMMARY OF THE INVENTION

There is provided according to the present invention a magnetic flow controller which transforms a low pressure inlet flow to a higher pressure volume of fluid over time to a pre-defined threshold pressure, and which controls the passage of the fluid so as to provide an outlet flow at a measurable high flux. Thus, this flow controller can allow measurement of the flow when the volume is substantially in an optimum range of measurement of a conventional flow meter, so that measurement errors will be minimal.

Accordingly, the invention provides a magnetic flow controller including a fluid flow passage having a magnet, a displaceable magnetic sealing member disposed in the passage, the displaceable member and the fluid flow passage being shaped to remain sealed during a first movement of the displaceable member through the flow passage, thereby to gradually build up fluid volume and pressure acting on the displaceable member, and shaped to rapidly fully open the seal, so as to generate a measurable volume of fluid through the passage.

According to a preferred embodiment, the flow controller further includes a return element adapted and configured to cause the displaceable member to return towards the magnet.

According to a preferred embodiment, the flow controller further includes an adjusting screw coupled to the magnet and mounted in the stop member for determining the point of engagement of the displaceable member and the adjusting screw.

According to one embodiment of the invention, the flow controller includes a flow passage defining a sealing wall between a fluid inlet having a ferromagnet and a fluid outlet, a displaceable, magnetically attracted sealing member sealingly disposed in the flow passage, the sealing wall and sealing member having interacting contours permitting sliding movement of the displaceable member through the flow passage, while maintaining the seal between the sealing member and the sealing wall, until a pre-defined pressure differential is reached which overcomes the reduced magnetic field, at which point the displaceable member is unseated from the sealing wall and accelerated away from the flow inlet so as to create a sudden drop in pressure and to permit a pulse of measurable volume/fluid flow through the passage.

According to a preferred embodiment of the invention, the movement of the displaceable member in the flow controller is characterized by Hysteresis motion.

According to one embodiment of the invention, the displaceable member has an hydrodynamic shape having a central elongate portion of constant diameter permitting movement along the sealing wall while maintaining the seal. This central portion controls the hysteresis motion of the displaceable member which, in turn, controls the volume of the fluid pulse.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
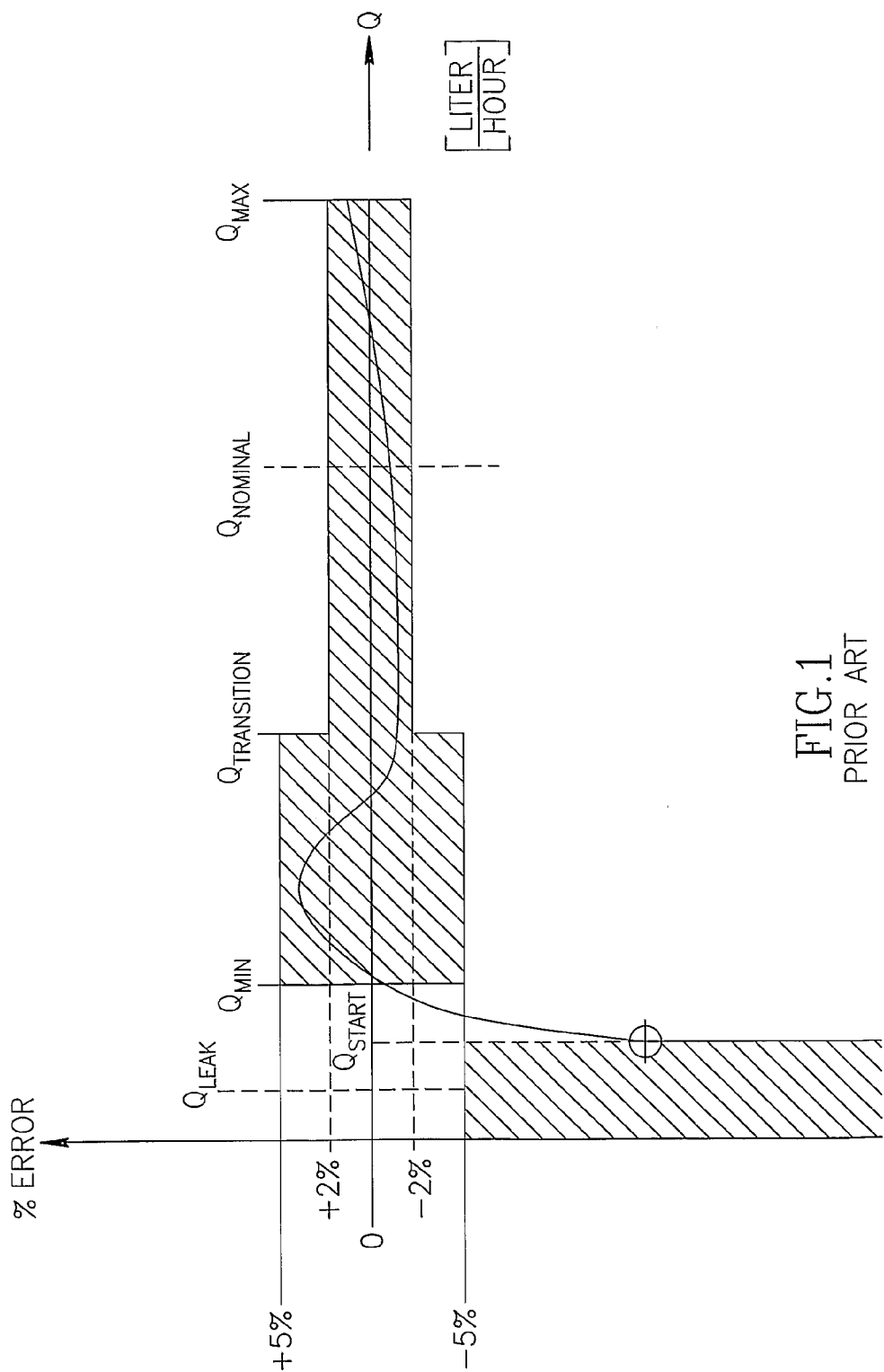
FIG. 1 is a is a graph illustrating the percentage measurement error over flux Q of a conventional water meter.

The present invention relates to a magnetic flow controller which transforms a slow reduction in pressure of fluid flow over time to a measurable fluid flow. Once a threshold pressure differential is reached, a flow passage through the flow controller opens rapidly to a relatively large opening, thereby generating a volume of fluid at high flux flowing through the passage, particularly to permit the measurement of the volume of fluid in a conventional flow meter. The device of the present invention integrates this low flux and transforms it to a measurable fluid flux (high volume flowing over a short time), so that the fluid can be measured by the fluid meter within its optimum error range. This is accomplished while maintaining a pressure drop in the flow meter which is within the permitted standards (i.e., less than 1 atmosphere for multi-jet meters at maximum capacity). Thus, the invention provides relatively sharp shifts between substantially high flux flow and no flow, in a pulse-like manner, downstream of the controller.

FIGS. 2a, 2b, 2c and 2d are schematic side and cross-sectional illustrations of a magnetic flow controller 10 constructed and operative in accordance with one embodiment of the present invention, in a closed and sealed orientation, and disposed in a fluid flow pipe 11. Flow controller 10 includes a fluid flow passage 12 through a body 20 having a fluid inlet 14 and a fluid outlet 16. Fluid inlet 14 is coupled to a source of fluid, for example, a water supply. Fluid outlet 16 is coupled downstream, for example, to a consumer, e.g., a water supply pipeline into a dwelling. In the illustrated embodiment, fluid inlet 14 includes a ferromagnetic stop member 18, which may include a ferromagnet or be formed of a ferromagnetic material. Stop member 18 is affixed to body 20 and includes one or more sealing members, here illustrated as an annular sealing member 19.

A seal member 22, which may be an annular member, here illustrated as an elongate seal member having a portion of constant diameter and internal walls 23, is mounted in body 20. A plurality of guide elements 24 may be provided in body 20 along the length of flow passage 12, or body 20 may be configured to include also internal guide elements. Disposed at the downstream end of body member 20 is an outlet stop member 26, mounted in body 20 by support elements 28, between which fluid flows out the fluid outlet 16.

A displaceable member 30 is disposed in flow passage 12, between guide elements 24 and is arranged to move between internal walls 23 of seal member 22. Displaceable member 30 and seal member 22 are configured to provide a fluid seal while displaceable member 30 moves relative to seal member 22 over a selected distance, so as to build up speed of movement of the displaceable member. This causes the displaceable member to accelerate to a speed such that, when the sealing engagement is disengaged, the displaceable member continues to move away from the inlet and provides a rapid and complete opening of the fluid flow passage. In the illustrated embodiment, displaceable member 30 is adapted and configured to seat against stop member 18 and prevent fluid flow into flow passage 12, in the closed orientation. Preferably, the displaceable member 30 has a hydrodynamic shape so as not to hinder fluid flow when the flow passage is in an open state. In the illustrated embodiment, displaceable member 30 includes a portion 32 of substantially constant diameter, here illustrated as a cylindrical portion. Cylindrical portion 32 is adapted and configured to slide along and sealingly engage seal member 22, as long as they are at least partially in registration with one another. It will be appreciated that either or both of seal member 22 and displaceable member 30 may include an elongate portion to permit relative movement while maintaining sealing engagement along the elongate portion, for the displaceable member to build up speed.

Figure 2A:
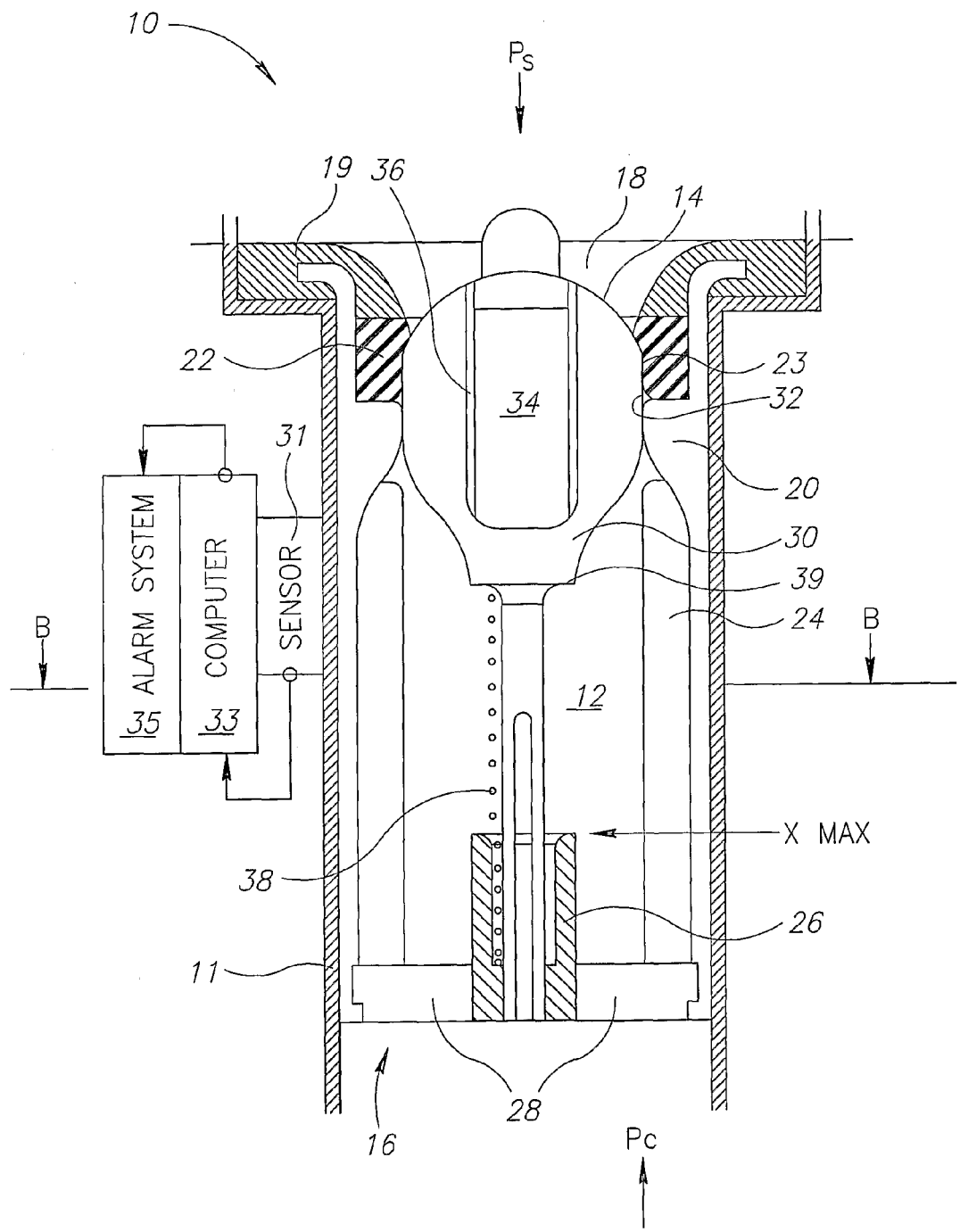
FIG. 2a is a schematic illustration of a fluid flow controller constructed and operative in accordance with one embodiment of the present invention, in a closed and sealed orientation.
Figure 2B:
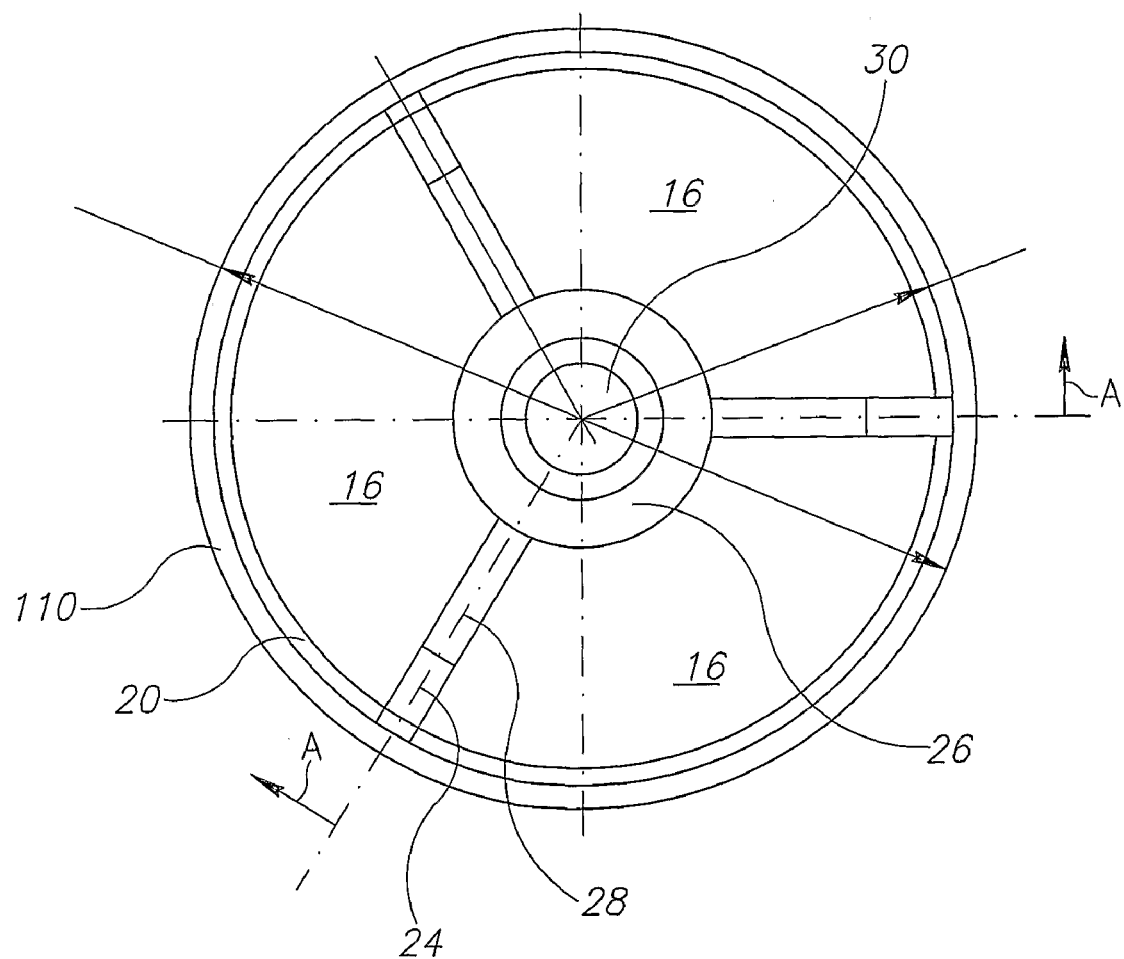
FIG. 2b is a sectional view of FIG. 2a taken along line B-B.
Figure 2C:
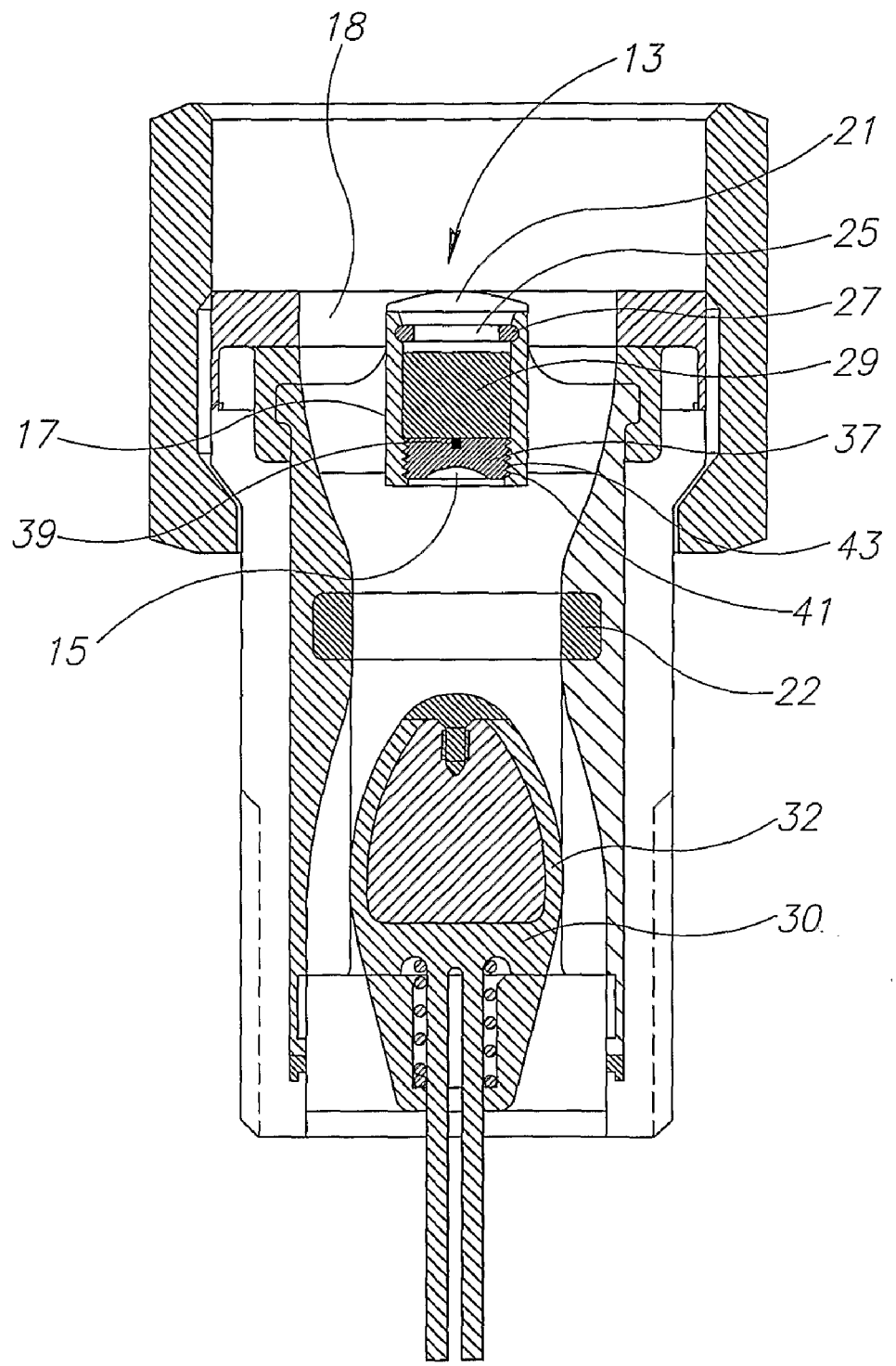
FIG. 2c is a schematic side sectional view of a fluid flow controller according to one embodiment of the invention in an open and unsealed orientation.
Figure 2D:
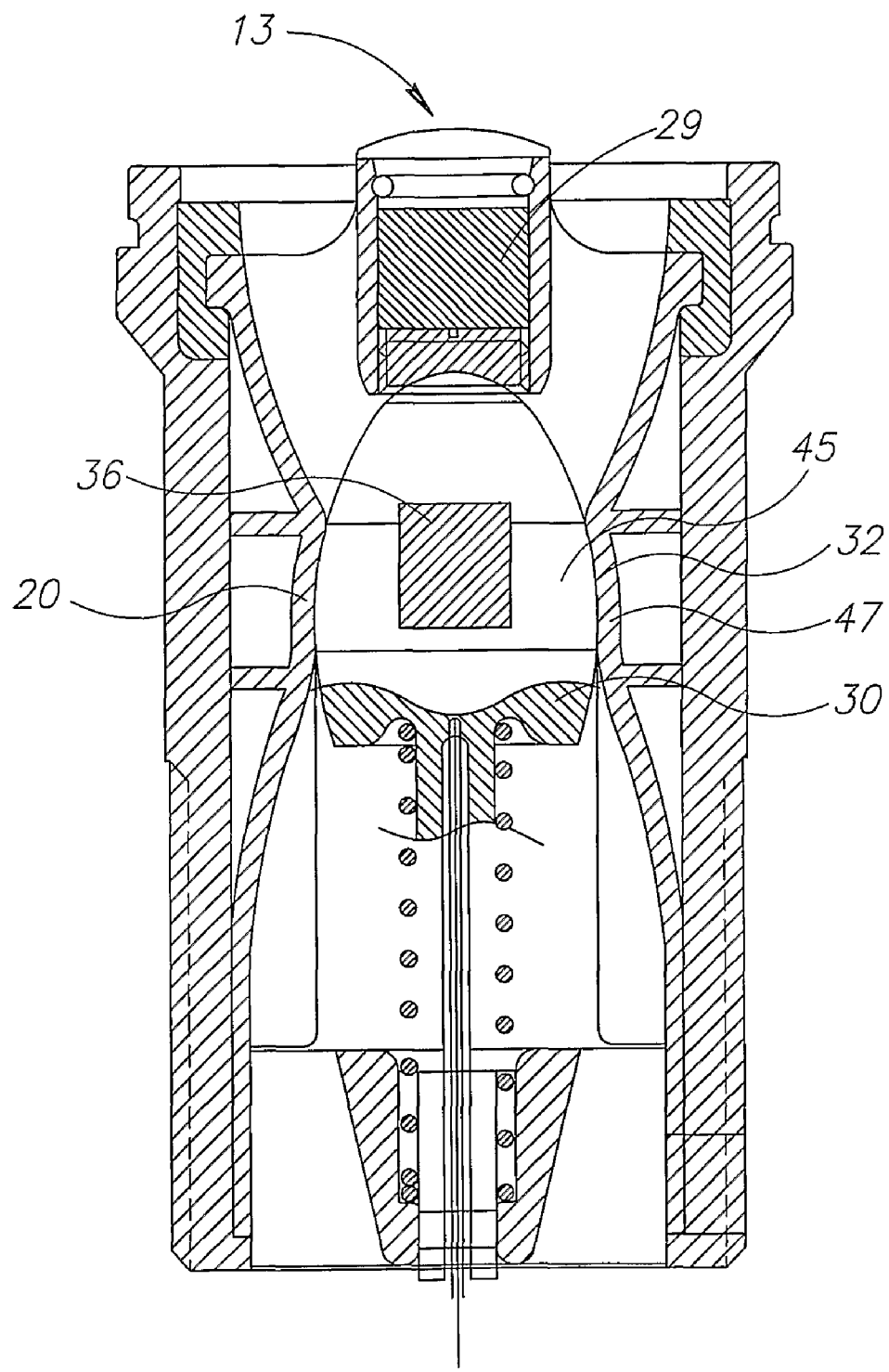
FIG. 2d is a schematic side sectional view of a fluid flow controller according to one embodiment of the invention in a closed and sealed orientation.

According to another embodiment of the invention illustrated in FIG. 2d at least portion 32 of displaceable member 30 may include sealing material 45 for sealing engagement with body 20, thus eliminating the need for seal member 22. Portion 32 of displaceable member 30 including sealing material 45 is configured to provide a fluid seal while displaceable member 30 moves relative to body 20 over a selected distance, so as to build up speed of movement of the displaceable member. As shown in FIG. 2d, sealing material 45 of portion 32 is in sealing engagement with body 20 when the displaceable member 30 is in a closed and sealed orientation.

A magnet 34 is mounted in displaceable member 30, or displaceable member 30 may be formed of a magnetic material. Preferably, a piece of ferromagnetic material 36 is also mounted in displaceable member 30, about magnet 34, so as to close the magnetic circuit.

Preferably, a return member 38 is associated with displaceable member 30. Return member 38 is configured and disposed to cause the displaceable member to move back towards stop member 18 from a fully open orientation. In the illustrated embodiment, return member 38 is a compression spring biased between a shoulder 39 on displaceable member 30 and stop member 26. According to an alternative embodiment, return member 38 may be a metal body or another magnet (not shown) disposed in or near stop member 26 and arranged so as to create a magnetic force to repel the magnet 34 in the displaceable member 30.

According to one embodiment of the invention, a magnetic sensor 31 is coupled adjacent the flow controller. Sensor 31 may be a reed switch, or a coil, or any other suitable sensor, which is capable of detecting motion of the displaceable member and providing an output signal corresponding thereto. Sensor 31 preferably is coupled to a computer 33, or other device for receiving the output signal and compiling data provided by the sensor. This data is processed to determine whether the movement of the displaceable member indicates the presence of a leak. If desired, computer 33 may be coupled to a controller 35 for providing a warning, such as an alarm or other indication of leakage.

It will be appreciated that, according to an alternative embodiment of the invention, the magnet may be mounted in the stop member in the inlet, and the displaceable member may be made of a ferromagnetic material, or both may include a magnet. The only requirement is that a magnetic force be created between the two which is sufficiently strong to hold the displaceable member in sealing contact with the stop member in the absence of fluid flow, and which is gradually reduced as the displaceable member moves away from the stop member.

According to one embodiment of the invention illustrated in FIG. 2c, stop member 18 further includes an adjusting screw 37 disposed in a substantially cylindrical housing 13 having a top open end (not shown) and a bottom open end 15, sidewalls 17, a cap 21 having a substantially cylindrical projection 25 including an annular groove for holding an O-ring seal 27, for sealing off the top open end of housing 13. It will be appreciated that housing 13 may be configured of various geometrical shapes and seal 27; cap 21 and projection 25 may be shaped accordingly to seal off the top end of housing 13.

Further according to the embodiment illustrated in FIG. 2c, housing 13 is adapted and configured for holding a magnet 29 coupled to adjusting screw 37 having annular screw threads 41. Preferably, adjusting screw 37 may be formed of non-corrosive ferromagnetic material for enhancing magnetic attraction and protecting magnet 29 from corroding. Preferably, coupling of magnet 29 to adjusting screw 37 may be accomplished by mere magnetic attraction. Adjusting screw 37 is disposed in housing 13 and supported by means of complementary annular screw threads 43 in sidewalls 17, adjacent bottom end 15. Adjusting Screw 37 can be displaced along a vertical axis within housing 13 in both directions by turning of a screwdriver placed in a screwdriver groove 39 on the top surface of the adjusting screw. Displacing adjusting screw 37 provides for determining the point of engagement of displaceable member 30 and adjusting screw 37. Preferably, the bottom surface of adjusting screw 37 is adapted and configured to substantially fully engage the top surface of displaceable member 30. It will be appreciated that since adjusting screw 37 is preferably formed of ferromagnetic material it is conducive to conduction of magnetic force there through for a better attraction of displaceable member 30 to magnet 29. By turning adjusting screw 37 the engagement between its bottom surface and the top surface of displaceable member 30 can be optimized thus maximizing the magnetic attraction between magnet 29 and displaceable member 30. Furthermore, displacing adjusting screw 37 causes the displacement of magnet 29 therewith closer or further to displaceable member 30 thus increasing or decreasing the magnetic attraction force there between, as desired.

It will be further appreciated that by determining the point of engagement of displaceable member 30 and adjusting screw 37 the surface of engagement between portion 32 of displaceable member 30 and seal member 22 is also determined. Thus, adjusting screw can be used to optimize the sealing engagement there between. It will be still further appreciated that adjusting screw 37 allows for constructing the flow controller according to the present invention of less accurate thus cheaper components and still have a good seal as well as good magnetic attraction between magnet 29 and displaceable member 30. Preferably, housing 13 is formed of non-corrosive material and is substantially sealed by means of cap 21 and adjusting screw 37 for protecting magnet 29 from being corroded.

Operation of this embodiment of the invention will now be described with reference to FIGS. 2a, 3, 4 and 5. FIG. 2a shows the device of the present invention in a closed and sealed orientation. As described above, displaceable member 30 is seated against inlet stop member 18 so that fluid, at the supply pressure Ps, is trapped above displaceable member 30, outside of fluid inlet 14. When a quantity of fluid is used or drawn off downstream, as by the consumer, the pressure inside flow passage 12 is reduced, thus creating a pressure differential across fluid inlet 14. When a large quantity of fluid is utilized, such as by opening a water faucet, the pressure differential is large, and the displaceable member 30 moves rapidly into flow passage 12, thereby permitting the inflow of fluid into and through the flow controller. As long as the demand remains, the pressure differential remains, and fluid continues to press against displaceable member 30 and flow around it and through the flow passage, as known.

However, in the case of a leak or a small fluid flow downstream of the flow controller, the pressure differential is small and builds very slowly and gradually, and the magnetic force acts to hold the displaceable member against the stop member, so the displaceable member does not move. As the pressure differential grows, a threshold will be reached wherein the force of the pressure differential acting on displaceable member 30 in the direction of the fluid outlet equals the force of the magnet acting on displaceable member 30 in the direction of the fluid inlet. When this threshold is passed, displaceable member 30 will begin to move through flow passage 12 towards the fluid outlet.

Figure 3:
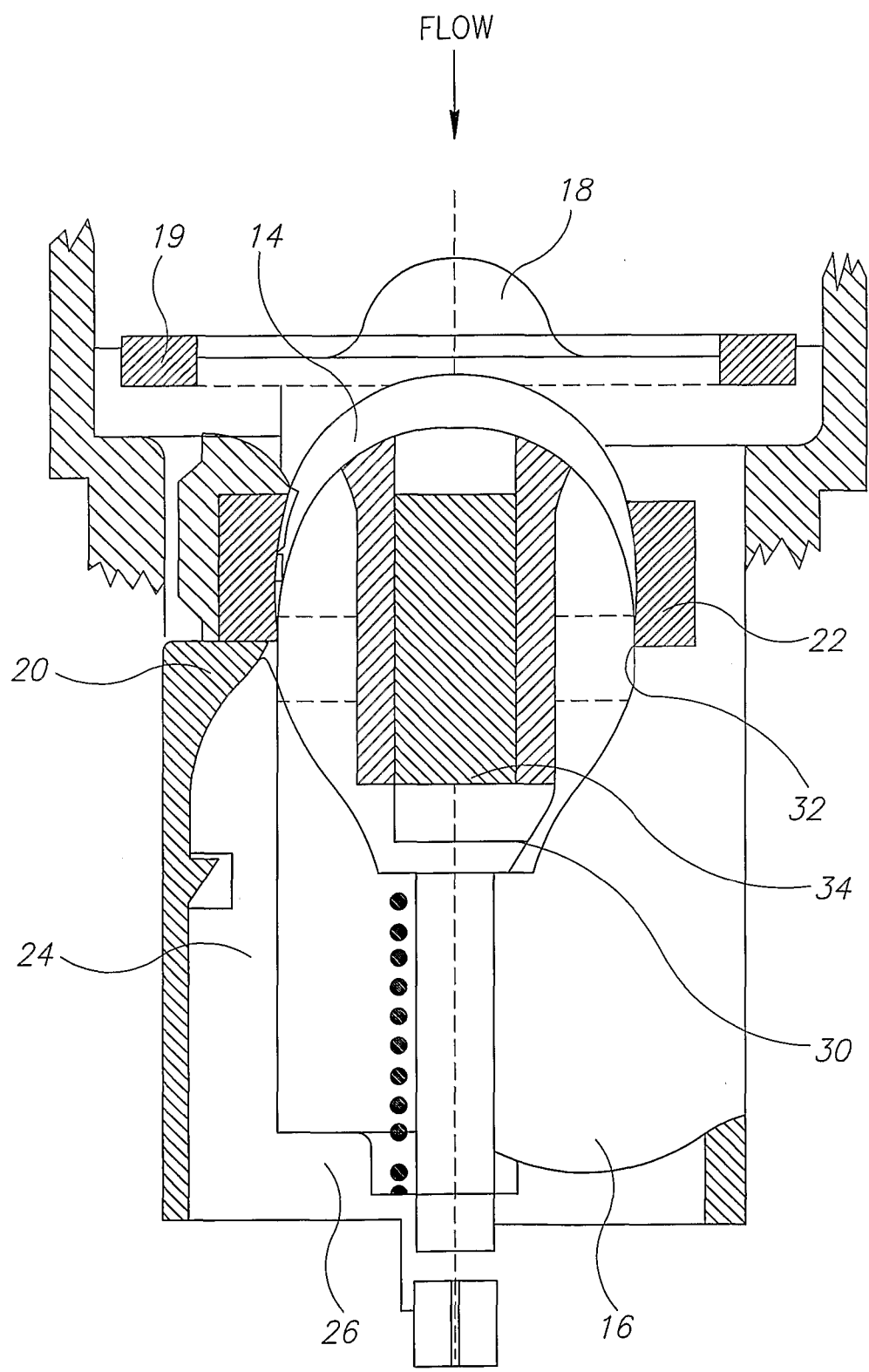
FIG. 3 is a schematic illustration of the fluid flow controller according to FIG. 2 in a moving but sealed orientation.

It is a particular feature of the present invention that the displaceable member 30 and flow passage 12 (or seal member 22 in the flow passage) are shaped such that the displaceable member can move a pre-selected distance through the flow passage without unsealing the seal between them. In this embodiment, this is provided by the portion 32 of substantially constant diameter. Thus, as seen in FIG. 3, the cylindrical portion 32 of displaceable member 30 moves along seal member 22 while remaining sealingly engaged. This means that the pressure differential across the fluid inlet in the flow controller of the present invention continues to grow without opening the flow passage, unlike conventional magnetic devices wherein the flow passage opens immediately following movement of the poppet.

It will be appreciated that, as displaceable member 30 moves away from stop member 18 due to the pressure differential across the fluid inlet, the force of the magnetic field between the ferromagnet in stop member 18 and magnet 34 in displaceable member 30 becomes smaller. This reduction in magnetic force acting in the direction of the flow inlet, acting together with the increase in force in the outlet direction due to the pressure of the volume of water acting to open the fluid inlet, serve to accelerate the movement of displaceable member 30 through flow passage 12 towards the fluid outlet 16 and increases the speed at which the displaceable member 30 moves away from the inlet and, therefore, the distance it moves from the seal member 22.

Figure 4:
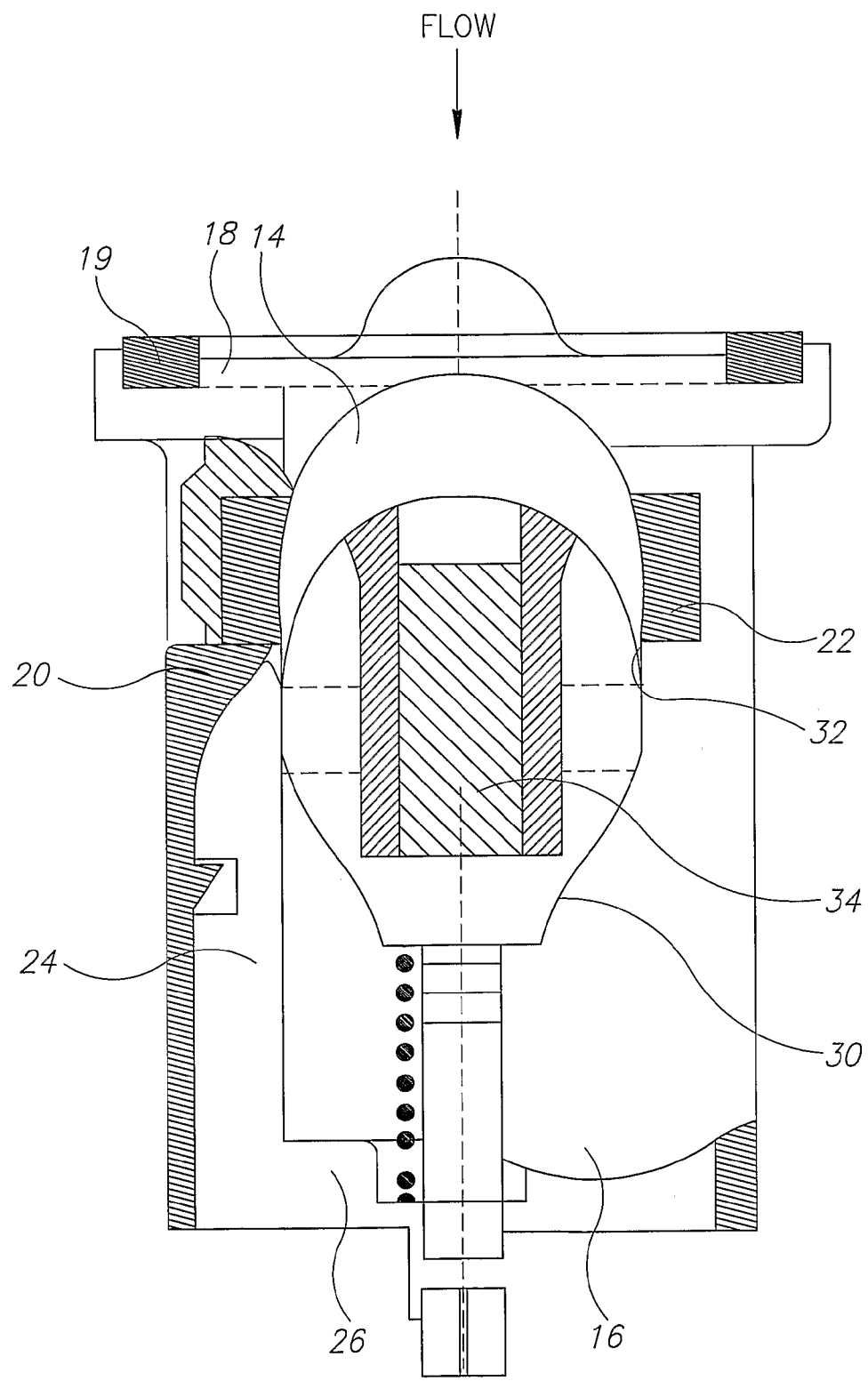
FIG. 4 is a schematic illustration of the fluid flow controller according to FIG. 2 in a further moving but sealed orientation.

Thus, displaceable member 30 continues to move in the direction of the flow outlet, as seen in FIG. 4. As can be seen, displaceable member 30 has moved through a selected distance relative to flow passage 12 and, due to the complementary shapes of the internal walls of the seal member 22 and displaceable member 30, the seal is not yet opened between them. This distance is determined by the length of the sealing engagement between seal member 22 and the displaceable member 30. This length is selected so as to permit the displaceable member 30, while moving in the direction of the outlet, to build up sufficient speed to continue its motion beyond the point where flow passage 12 is opened. Due to that speed, the displaceable member 30 moves away from stop member 18, thus the magnetic force urging displaceable member in the opposite direction is decreased and the displaceable member can continue its motion in the outlet direction. The displaceable member 30 is permitted to move a sufficient distance so that the differential pressure, even though decreasing due to the flow of fluid through the passage, will remain greater than the magnetic force. In this way, the flow controller according to the present invention prevents displaceable member 30 from oscillating between closed and open positions of flow passage 12 (a phenomenon known as "hunting", caused by the magnetic force being still sufficiently strong to counteract the force exerted by the differential pressure on displaceable member 30 to move in the direction of fluid outlet 16).

Figure 5:
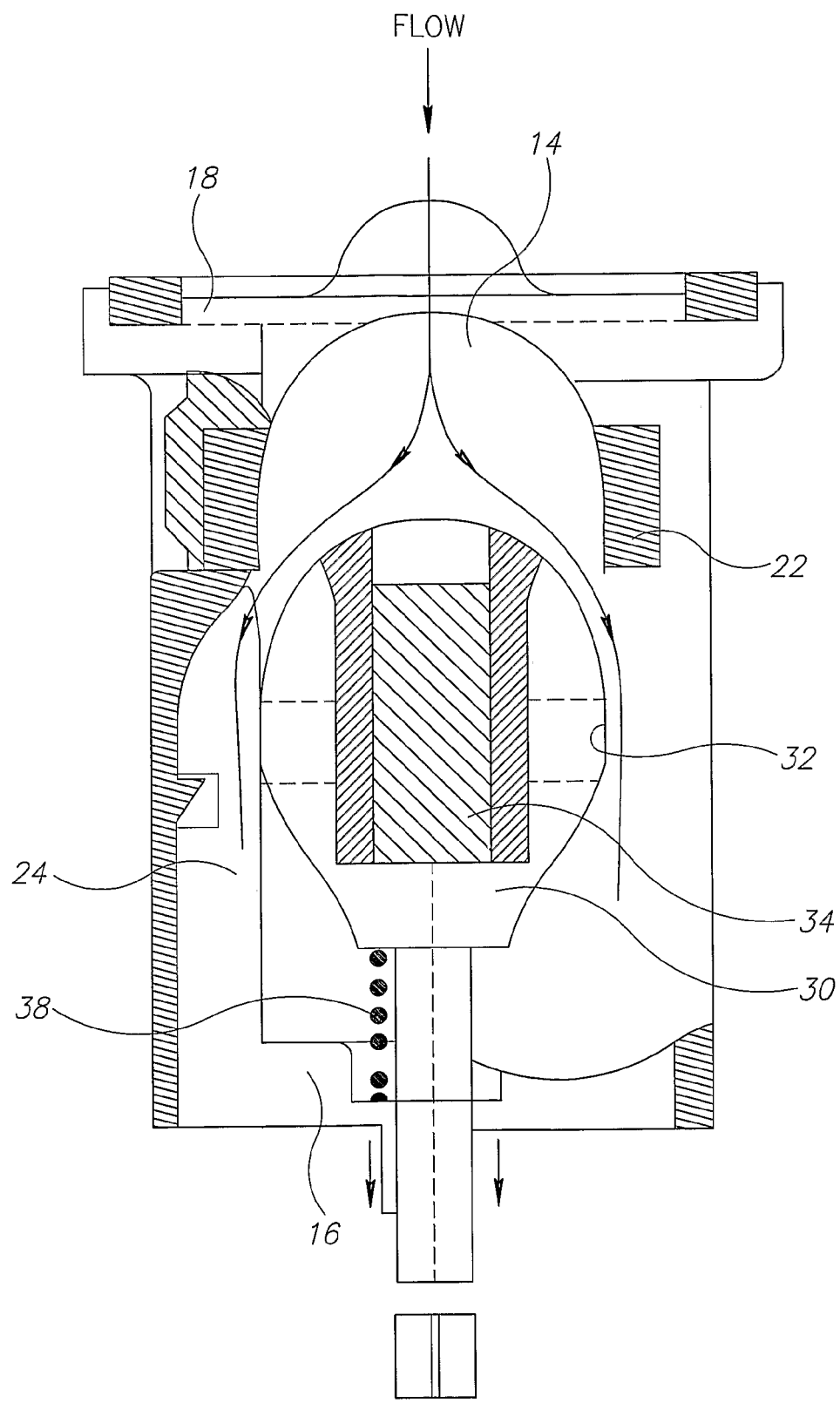
FIG. 5 is a schematic illustration of the fluid flow controller according to FIG. 2 in an open and unsealed orientation.

As the effect of the force of the magnetic field becomes smaller, while the pressure acting in the outlet direction remains the same or larger, displaceable member 30 moves at an accelerated rate past seal member 22 to an unsealed position, as shown in FIG. 5. Displaceable member 30 and flow passage 12 are designed such that the flow path opens suddenly to a substantially full opening with a relatively large surface area, permitting rapid flow of the previously trapped fluid at high flux around displaceable member 30 and through the flow passage and, as stated above, so that the displaceable member is sufficiently far from the seal member that the magnetic force is not sufficient to immediately cause it to change direction and close the flow passage. This design of a body having a wide passage with a hydro dynamically shaped displaceable member provides a relatively small head loss through the device and prevents turbulence. According to a preferred embodiment of the invention, the flow controller is associated with a flow meter (not shown), and the high flux generated by the flow controller is designed to be within the optimal measurement range of the flow meter.

At this stage, a sufficient quantity of fluid to replace that withdrawn downstream has flowed through the flow passage, and the pressure Pc rises, so the pressure differential acting on the displaceable member shrinks, until Ps once again equals Pc. Now there is substantially no pressure differential acting on the displaceable member in the outlet direction, and the magnetic field begins to act on the magnet, pulling the displaceable member back towards the fluid inlet. As it approaches the fluid inlet, the magnetic force acting on the displaceable member continually increases, causing the displaceable member to accelerate towards the inlet. In addition, return member 38, if present, now acts on displaceable member 30, urging it back in the direction of stop member 18. In the illustrated embodiment, the spring 38 urges displaceable member 30 towards stop member 18. As displaceable member 30 moves towards stop member 18, the force of the magnetic field acting on the displaceable member increases, while the pressure differential remains small. In this way, displaceable member 30 accelerates from a fully open orientation to a sealed and then closed orientation, until the pressure differential builds up again, as described above. This prevents substantial quantities of fluid from flowing undetected through flow passage 12.

It is a particular feature of the present invention that the forces acting on the displaceable member cause the displaceable member to be accelerated first in the direction which opens the flow passage, and then in the direction which closes the flow passage, thus allowing passage of fluid through the flow controller in pulses of flux values within the measurable range of a meter.

Figure 6:
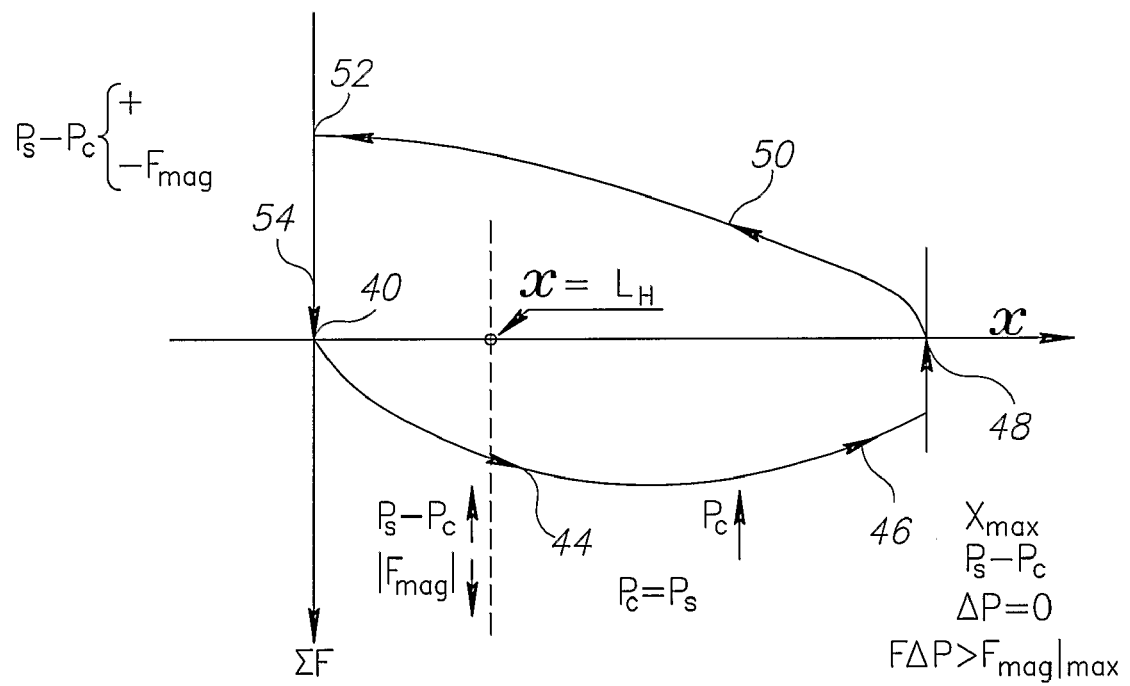
FIG. 6 is a graph illustrating the hysteresis curve of a displaceable member in a preferred embodiment of the invention.

According to a preferred embodiment of the invention, the movement of the displaceable member 30 from and to the stop member 18 under leakage conditions is characterized by hysteresis motion. A schematic illustration of one example of such a hysteresis curve is shown in FIG. 6. Point 40 corresponds to FIG. 2, where the displaceable member seats against the stop member and the flow controller is closed and sealed. In this position, there is no pressure differential across the inlet, so the sum of the forces acting on the displaceable member is substantially zero, and the displaceable member 30 does not move. The sum of the forces acting on the displaceable member can be described substantially by the equation $$\Sigma F_i = F_s - F_{mag} - F_k + \Delta P * A$$

where $F_s$ is the force of stop member 18 acting on the displaceable member, $F_{mag}$ is the magnetic force, $F_k$ is the force of the return element, $\Delta P$ equals $P_s - P_c$, and A is the area of the displaceable member on which the pressure acts.

When there is a leak downstream of the flow controller, the pressure differential ($P_s - P_c$) begins slowly to increase, but the displaceable member is still unable to move since the force of the magnetic field and the return force remain constant, while the force of stop member 18 decreases a corresponding quantity. As the pressure differential, plus any other forces acting to open the flow passage, reach a value higher than the force of the magnet and the return member to close the flow passage, the displaceable member begins to move. It is a particular feature of the invention that, as the displaceable member begins to move, the magnetic force decreases while the pressure differential increases, the displaceable member accelerates towards the outlet, as indicated by arrow 44 on the curve. The displaceable member continues to accelerate, while maintaining the seal, until the distance X from stop member 18 equals $L_H$, where $L_H$ is the distance the displaceable member moves before unsealing the flow passage. $L_H$ is the significant parameter in creation of the hysteresis effect, and is a result of the complementary shapes of the displaceable member and the flow passage or seal member. It is important that the parameter $L_H$ be sufficiently large to prevent an equilibrium state of the displaceable member in the open orientation under leakage conditions, and to prevent hunting (rapid opening and closing of the flow controller).

After $L_H$, the pressure differential gradually drops, and the major force acting on the displaceable member becomes the magnetic force, which slows down the motion of the displaceable member towards the fluid outlet, as shown by the curve with reference arrow 46, until the displaceable member stops at $X_{max}$, the maximum displacement of the displaceable member from stop member, at point 48. At this point, in the illustrated embodiment, the displaceable member hits stop member 26, and cannot move any further. At this stage, the increasing force $F_{mag}$ of the magnetic field, together with the boost received from the return member, provides a step increase of the force acting on the displaceable member, and reverses the direction of motion of the displaceable member. As shown at reference numeral 50, the displaceable member now accelerates back towards stop member 18, as shown by arrow 52 on the curve. When the displaceable member hits stop member 18, the sum of the forces acting on the displaceable member drops, in a step drop, to the original value, indicated by arrow 54 on the curve. It will be appreciated that, when there is a normal water flow through the device, it remains open so as not to impede the flow. However, during slow flows, which would ordinarily not be measured by a meter, the device described above allows the flux to fluctuate from 0 to Qt substantially in the form of pulses, and provide for measurement of relatively low flux by conventional meters during the portion of the pulse in the range of Qt.

Figure 7:
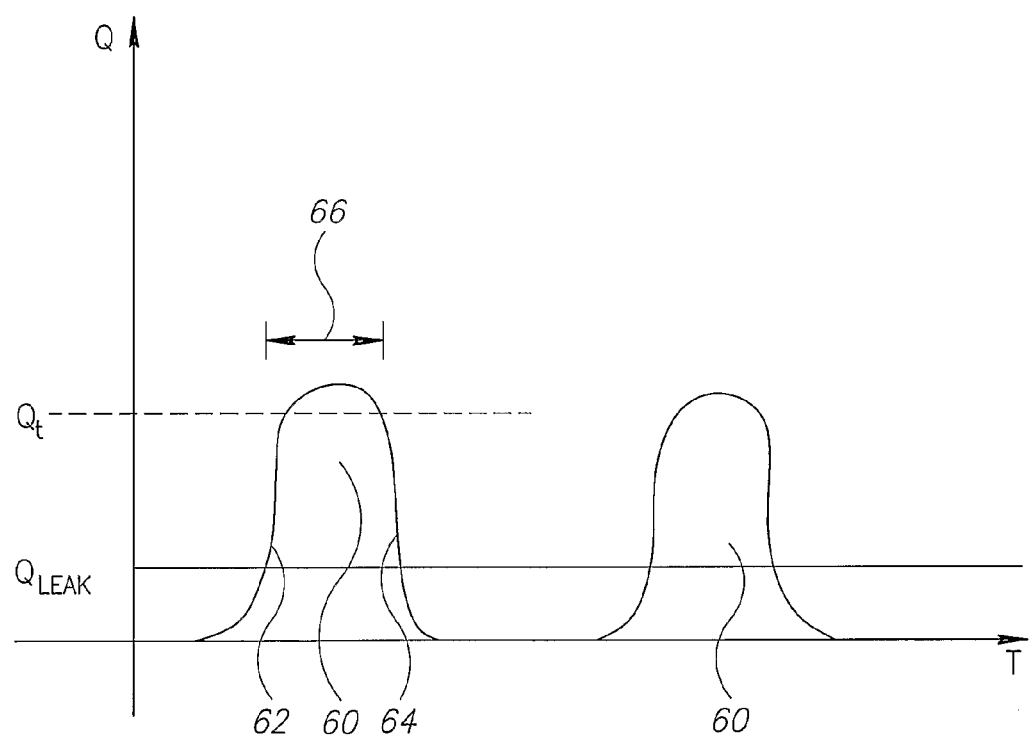
FIG. 7 is a graph illustrating the flux over time generated by a device according to the present invention.

A schematic graphical illustration of the flux through the fluid passage over time produced by one embodiment of the invention, is shown in FIG. 7. The value of flux which can be measured with minimal error by the meter is Qt. As can be seen, $Q_{leak}$ is too small to be measured in this range. The flow controller of the present invention integrates the low flux ($Q_{leak}$) and transforms it into pulses 60 of fluid flux in the range of Qt, so that the pulses can be measured within the optimum error range by the fluid meter. Rapid increase 62 of the flux is a result of the rapid and wide opening of the fluid flow passage (represented by arrow 46 in FIG. 6), while relatively sharp drop 64 of pulse 60 is a result of rapid closure of the inlet (represented by curve 50 between $X_{max}$ and $L_H$). The length of constant diameter portion 32 of displaceable member 30 and/or of the seal member 22 determines the width 66 of the pulse at Qt.

Figure 8:
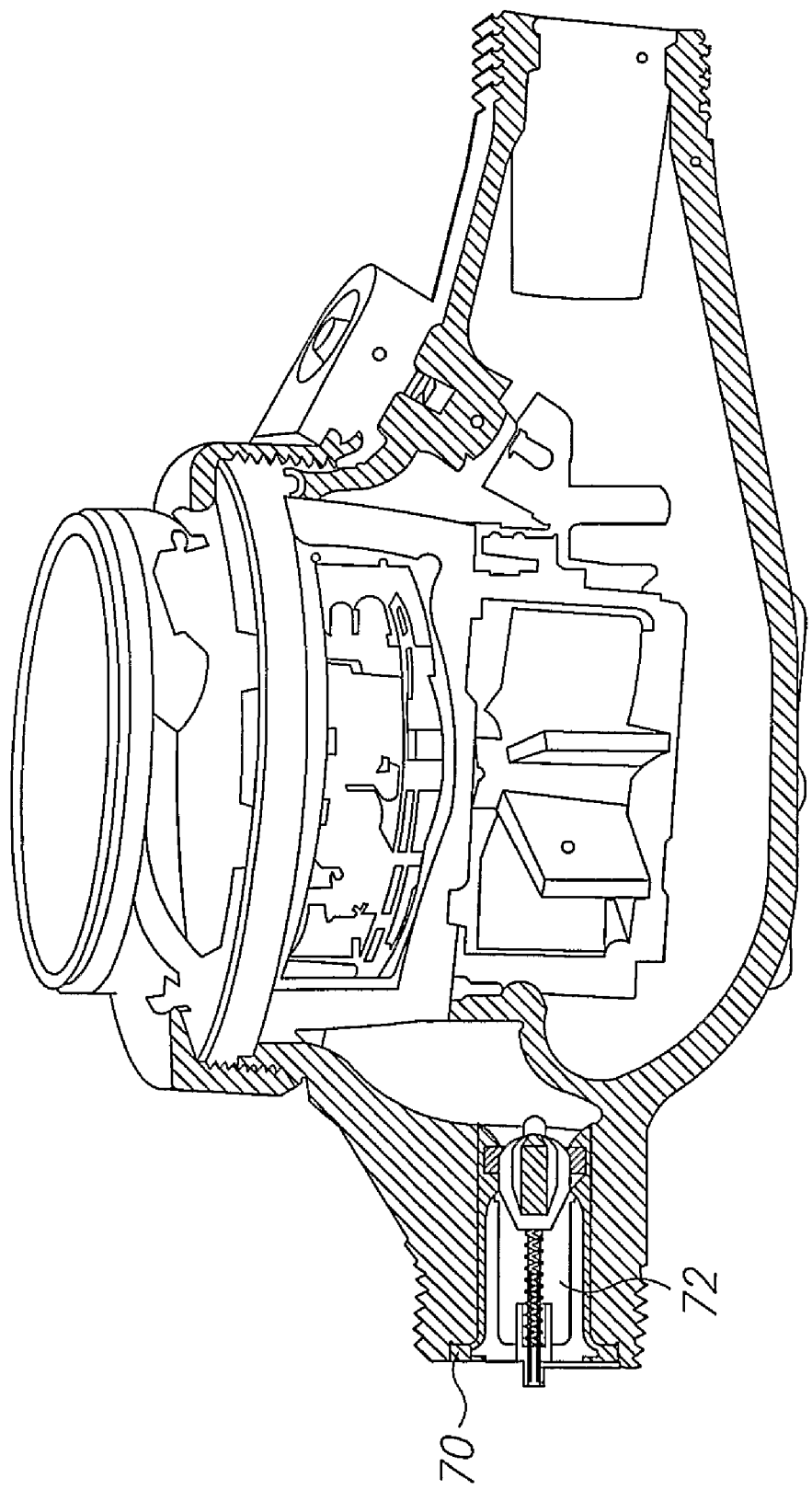
FIG. 8 is a schematic illustration of a fluid flow controller according to the invention mounted in a water meter.
Figure 9:
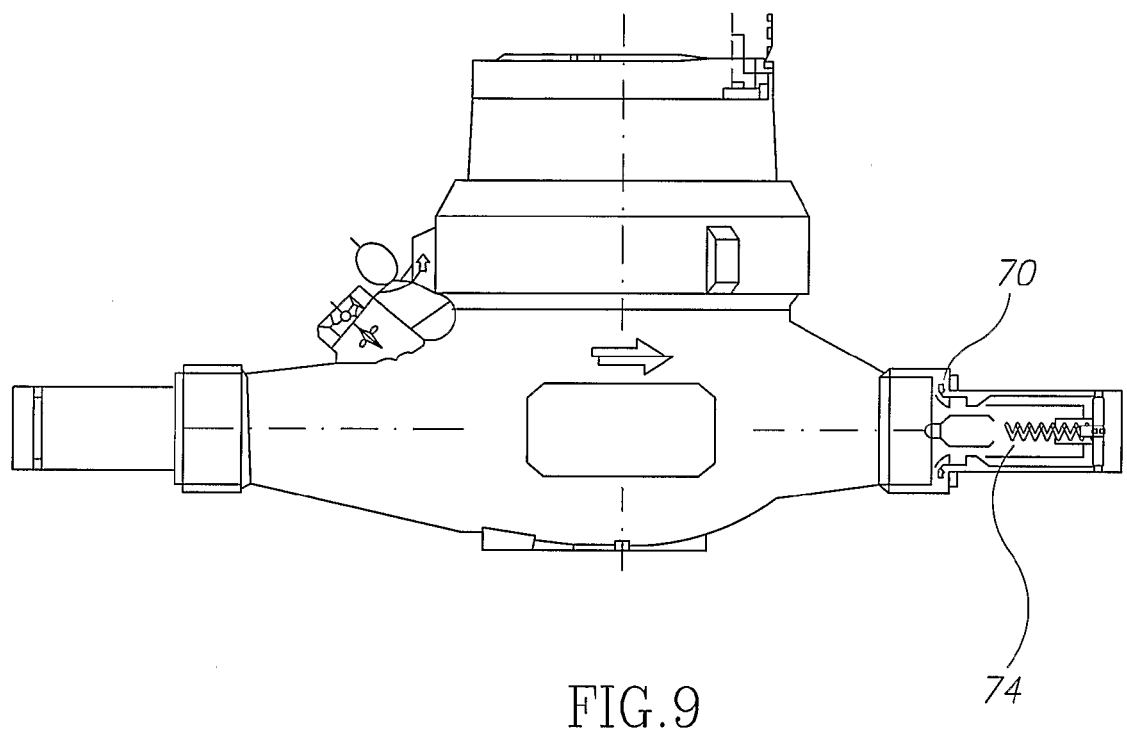
FIG. 9 is a schematic illustration of a fluid flow controller according to the invention mounted in an alternative water meter.

Preferably the device of the present invention is sized so that it can be mounted in existing supply lines without cutting fluid flow pipes. FIGS. 8 and 9 are illustrations of two embodiments of flow controllers of the present invention mounted in a water meter line. As can be seen, mounting flanges 70 may be provided on either end of the magnetic flow controller, to permit mounting of the flow controller in a suitable position for operation. In the embodiment of FIG. 8, the flow controller 72 has mounting flanges adjacent the fluid outlet of the flow controller. This embodiment is suitable for meters having an outlet pipe in which the flow controller can fit. Alternatively, as shown in FIG. 9, mounting flanges 70 may be provided adjacent the fluid inlet of a flow controller 74. In this way, the flow controller can be sturdily mounted by means of the record, rather than in the meter.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A magnetic flow controller comprising:
a body defining a fluid flow passage having an inlet and an outlet;
a stop member mounted across said inlet; and
a displaceable member disposed in said body adjacent said stop member;
wherein at least one of said stop member and said displaceable member includes a magnet, and the other of said stop member and said displaceable member includes a ferromagnetic portion, so as to create a magnetic force, acting on said displaceable member, sufficient to cause the displaceable member to engage said stop member so as to close and seal the flow passage;

said body also including walls defining a first, elongate portion of substantially constant diameter for sealingly engaging said displaceable member and a second portion, having a diameter larger than said constant diameter, said body having a plurality of guide members extending radially from the walls of the second portion, wherein said displaceable member, when in said second portion, non-sealingly engages said guide members and is disengaged from said walls of said body;

said first, elongate portion being of sufficient length to permit said displaceable member to generate a measurable volume of fluid before said displaceable member disengages from said walls to unseal said flow passage, thereby generating measurable volume flowing through the passage when said displaceable member disengages from said walls;

further comprising a return element adapted and configured to urge the displaceable member to return towards said stop member;

wherein said return element includes a magnet.

2. A magnetic flow controller comprising:

a body having a single wall defining a fluid flow passage having an inlet and an outlet;

a stop member mounted across said inlet; and a displaceable member disposed in said body adjacent said stop member;

wherein at least one of said stop member and said displaceable member includes a magnet, and the other of said stop member and said displaceable member includes a ferromagnetic portion, so as to create a magnetic force, acting on said displaceable member, sufficient to cause the displaceable member to engage said stop member so as to close and seal the flow passage;

said single wall of said body defining an engaging portion of substantially constant diameter configured for sealingly engaging said displaceable member and a wider portion, having a diameter larger than said constant diameter configured for disengaging from said displacement member, said body having a plurality of guide members extending radially from the wall of the wider portion, wherein said displaceable member, when in said wider portion, engages said guide members without sealing the flow passage and is disengaged from said wall of said body;

said engaging portion being of sufficient length to permit said displaceable member to generate a measurable volume of fluid before said displaceable member disengages from said wall to unseal said flow passage, thereby generating a pulse of fluid of measurable volume flowing through the passage when said displaceable member disengages from said wall.

3. The flow controller according to claim 2, wherein the flow passage includes a seal member adapted and configured to sealingly engage said displaceable member, and wherein said engaging portion is defined in said seal member.

4. The flow controller according to claim 2, wherein the displaceable member has a hydrodynamic shape.

5. The flow controller according to claim 2, wherein said stop member further comprises an adjusting screw coupled to said magnet and displaceably disposed in a housing for determining a point of engagement of said displaceable member and said stop member.

6. The flow controller according to claim 5, wherein said housing comprises top and bottom open ends, sidewalls, a cap for sealing off said top open end of said housing, and wherein said adjusting screw comprises annular screw threads for being displaced along a vertical axis in both directions within said housing by means of complementary annular screw threads in said sidewalls.

7. The flow controller according to claim 5, wherein said adjusting screw is formed of non-corrosive ferromagnetic material and wherein said housing is formed of non-corrosive material and is substantially sealed.

8. The flow controller according to claim 2, further comprising a return element adapted and configured to urge the displaceable member to return towards said stop member.

9. The flow controller according to claim 2, wherein movement of said displaceable member in the flow controller under leakage conditions is hysteresis motion.

10. The flow controller according to claim 2, further comprising a sensor arranged to sense movement of said displaceable member and provide an output corresponding to said sensed movement.

11. A method for controlling fluid flow for measuring a small flow of fluid, the method comprising:

a stop member mounted across an inlet closing and sealing an inlet of a body having a single wall defining a flow passage by a displaceable member disposed in said body;

building up differential pressure around said displaceable member until a threshold is overcome;

after said threshold is overcome, moving said displaceable member under magnetic force through an engaging portion of said body of substantially constant diameter and of pre-selected length in sealing engagement with the wall of said body under force of increasing pressure of wider fluid to build up sufficient speed to continue its motion when it enters a portion of said body, said wider portion having a diameter larger than said first diameter, where said displaceable member disengages from said wall of the body and engages a plurality of guide members extending radially from the wall of the wider portion without sealing the flow passage, where said displaceable member, when in said wider portion, opens said flow passage when a measurable volume of fluid has been generated and reduces said differential pressure and generates a pulse of fluid to flowing to said outlet; and moving the displaceable member under force back towards the fluid inlet to close and seal said inlet.

12. The method according to claim 11, further comprising:
providing a return element near said outlet for urging said displaceable member towards said inlet.

13. The method according to claim 12, wherein said step of providing a return element includes providing a magnet near said outlet for urging said displaceable member towards said inlet.

14. The method according to claim 11, further comprising:
providing an adjustable screw coupled to said magnet in said stop member for determining a point of engagement of said displaceable member and said stop member.

15. The method according to claim 11, further comprising:
mounting said adjustable screw and said magnet in a housing in said stop member.

16. The method according to claim 11, further comprising:
sensing movement of said displaceable member; and
providing an output signal corresponding to said sensed movement.

* * * * *